(12) United States Patent
Liu et al.

(10) Patent No.: US 8,477,607 B2
(45) Date of Patent: Jul. 2, 2013

(54) SYSTEM AND METHOD FOR RESOURCE ADMISSION AND CONTROL

(75) Inventors: Bo Liu, Shenzhen (CN); Lili Xue, Shenzhen (CN); Ting Zou, Shenzhen (CN); Zhenzhu Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 12/421,946

(22) Filed: Apr. 10, 2009

(65) Prior Publication Data
US 2009/0219946 A1 Sep. 3, 2009

Related U.S. Application Data

(63) Continuation of application No. PCT/CN2007/002907, filed on Oct. 10, 2007.

(30) Foreign Application Priority Data

Oct. 10, 2006 (CN) .......................... 2006 1 0135846

(51) Int. Cl.
*H04J 1/16* (2006.01)
(52) U.S. Cl.
USPC .......................................... 370/230; 370/437
(58) Field of Classification Search
USPC .................. 370/229, 230, 431, 437, 464, 478, 370/480, 485, 486, 487, 489, 490
See application file for complete search history.

(56) References Cited

U.S. PATENT DOCUMENTS

| | | | |
|---|---|---|---|
| 7,664,495 B1 * | 2/2010 | Bonner et al. | 455/433 |
| 8,131,831 B1 * | 3/2012 | Hu | 709/223 |
| 2003/0074443 A1 * | 4/2003 | Melaku et al. | 709/224 |
| 2003/0120135 A1 * | 6/2003 | Gopinathan et al. | 600/300 |

(Continued)

FOREIGN PATENT DOCUMENTS

| CN | 1391396 A | 1/2003 |
|---|---|---|
| CN | 1665322 | 9/2005 |

(Continued)

OTHER PUBLICATIONS

Office Action in corresponding Chinese Application No. 2006101358461 (Jul. 24, 2009).

(Continued)

*Primary Examiner* — Obaidul Huq
(74) *Attorney, Agent, or Firm* — Leydig, Voit & Mayer, Ltd.

(57) ABSTRACT

System and method for resource admission and control is disclosed. The system for resource admission and control includes an interface unit for application function unit configured to receive service request sent from the application function unit; a policy decision function unit configured to identify the type of an access network according to the service request received by the interface unit for the application function unit and select corresponding service logic for resource admission and control according to the identified type of access network. According to the technical solutions, no matter the request for resource is made to a fixed access network defined in TISPAN, or to a wireless access network defined in the 3GPP, the policy decision function unit xPDF may identify the type of the access network and select corresponding service logic to perform resource admission and control. The xPDF conceals the details of the access network from the AF such that the solution for network construction can be simplified and the system maintenance may become simple and convenient.

11 Claims, 10 Drawing Sheets

U.S. PATENT DOCUMENTS

| | | | |
|---|---|---|---|
| 2004/0066756 A1* | 4/2004 | Ahmavaara et al. | 370/328 |
| 2004/0224682 A1* | 11/2004 | Kang | 455/433 |
| 2005/0135375 A1* | 6/2005 | Hurtta et al. | 370/395.2 |
| 2007/0206515 A1* | 9/2007 | Andreasen et al. | 370/255 |
| 2008/0046963 A1* | 2/2008 | Grayson et al. | 726/1 |

FOREIGN PATENT DOCUMENTS

| | | |
|---|---|---|
| CN | 1705296 A | 12/2005 |
| CN | 1747467 | 3/2006 |
| CN | 1761351 A | 4/2006 |
| CN | 1832447 A | 9/2006 |
| CN | 1832448 | 9/2006 |
| CN | 101163102 B | 7/2010 |
| WO | WO 2005/046147 A1 | 5/2005 |
| WO | WO 2005/064956 A1 | 7/2005 |

OTHER PUBLICATIONS

1st Office Action in corresponding Chinese Application No. 200710148100.9 (Aug. 21, 2009).

1st Office Action in corresponding European Application No. 07816521.4 (Jan. 10, 2011).

2nd Office Action in corresponding European Application No. 07816521.4 (Feb. 1, 2011).

Extended European Search Report in corresponding European Application No. 07816521.4 (Nov. 18, 2009).

Written Opinion of the International Searching Authority in corresponding PCT Application No. PCT/CN2007/002907 (Jan. 10, 2008).

"ETSI ES 282 001—Telecommunications and Internet converged Services and Protocols for Advanced Networking (TISPAN); NGN Functional Architecture Release 1," Aug. 2005, Version 1.1.1.

"Draft ETSI ES 282 003—Telecommunications and Internet Converged; Services and Protocols for Advanced Networking (TISPAN); Resource and Admission Control Sub-system (RACS); Functional Architecture; Release 2," Dec. 2006, Version 0.2.0, ETSI, France.

"Draft ETSI MI 2043—Telecommunications and Internet Converged; Services and Protocols for Advanced Networking (TISPAN); Analysis on other SDOs work in the area of the RACS architecture; Analysis on the 3GPP PCC Release 7 architecture," Dec. 2006, Version <0.0.3>, ETSI, France.

"3GPP TS 23.203—3rd Generation Partnership Project; Technical Specification Group Services and System Aspects; Policy and charging control architecture (Release 7)," May 2006, Version 1.0.0, 3rd Generation Partnership Project, Valbonne, France.

"3GPP Ts 23.203—3rd Generation Partnership Project; Technical Specification Group Services and System Aspects; Policy and charging control architecture (Release 7)," Sep. 2006, Version 7.0.0, 3rd Generation Partnership Project, Valbonne, France.

* cited by examiner

SYSTEM AND METHOD FOR RESOURCE ADMISSION AND CONTROL

CROSS-REFERENCE TO RELATED APPLICATIONS

The present application is a continuation of International Application No. PCT/CN2007/002907, filed on Oct. 10, 2007, which claims the benefit of Chinese Patent Application No. CN200610135846.1, filed on Oct. 10, 2006, both of which are hereby incorporated by reference in their entireties.

FIELD OF THE INVENTION

The present invention relates to communication fields, more specifically, to a system and method for resource admission and control.

BACKGROUND

The resource admission and control sub-system proposed by ETSI TISPAN relates to bearer control layer. It implements policy control, resource reservation, admission control as well as accessing, convergence, and translation of network address port/protocol of the core network. The framework of resource admission and control subsystem is illustrated in FIG. 1.

In FIG. 1, RACS refers to resource admission and control sub-system which includes RACS-related function units such as a service-based policy decision function (SPDF) unit, an access-unction (A-RACF) unit, an application function (AF) unit, a network attachment sub-system (NASS), an access node (AN), a resource control enforcement function (RCEF) unit, and a border gateway function (BGF) unit, etc.

The RACS is a subsystem for implementing policy control, resource reservation, and admission control. The RACS further provides supports for the control of Network Address Translation (NAT) in the BGF. The RACS provides a policy-based transmission control service for the application layer. With the RACS, the application layer accomplishes admission control, application, and reservation of the bearer resources within the coverage of the application layer.

The SPDF provides below functions:

checking to see if the information in the request from the AF is consistent with the local policy rules defined by the SPDF;

authorizing the resources requested by the AF session. The SPDF utilizes the information in the request from the AF to compute appropriate authorization. (e.g., compute the number of media components which need to be authorized);

determining the location of BGF and/or A-RACF according to the requested transmission capability;

requesting A-RACF resource;

requesting services from the BGF. These services include opening/closing gate control, marking the packet, allocating resource based on flow, NAT, hosted NAT transversal, setting up uplink and downlink service policy, measuring service, etc.;

concealing internal details of RACS from the AF;

concealing details of transport layer from the AF;

mapping the resource request of AF to the request for the A-RACF and/or BGF.

The A-RACF includes below functions of: admission control; and network layer policy assembly.

In 3GPP R7, the service based local policy (SBLP) and flow based charging (FBC) in 3GPP R6 are combined into a policy and charging control (PCC) scheme, as illustrated in FIG. 2, in which:

The functions related to the policy control in PCC include:

"gate control" function: enable or disable the packet passing capability of service data flows (SDF). No matter the charging control and policy control functions have or have not been applied, the "gate control" function can be applied to a session.

Session event: The capability of notifying the application layer events and reacting to the application layer events may trigger new user level behavior. The session events capability is a necessity for the application of gate control function. For instance, in the gate control function, the session termination event may trigger a corresponding packet disable behavior.

Quality of Service (QoS) authorization function: Authorized QoS refers to a maximum QoS authorization for some IP flows. When multiple IP flows exist in one bearer, the authorized QoS for these flows may be combined together as the authorized QoS for the bearer. Subscription information relating to QoS may be used to assist the specific QoS authorization operation, including acceptation, rejection or modification.

QoS execution function: The QoS execution function of policy and charging control (PCC) must be consistent with the function of PEP in the service based local policy (SBLP). The QoS execution function includes degrading processing of the requested bearer QoS performed by the gateway (GW) when establishing the bearer. The policy and charging rules function (PCRF) may also actively provide authorized QoS information for the GW through Gx+ reference point according to some triggering condition and enable the GW for execution.

The Charging related functions include:

charging association: support for charging association between the application layer charging and the bearer layer charging.

charging control: IP flow is identified in accordance with the charging rule and a corresponding charging operation is performed. Related subscription information should also be taken into consideration in the process. The charging rule in the new PCC may be provided by PCRF dynamically or may be pre-configured in the GW.

According to prior art, the implementation of SPDF function entity relating to TISPAN RACS specification and the implementation of PCRF function entity relating to 3GPP PCC specification have already been provided. Both the implementations of SPDF and PCRF need to provide interfaces for the application layer function AF. The AF requests resources from the bearer control layer through the interfaces.

In RACS specification, the interface between SPDF and AF is Gq' interface. The message type relating to the interface includes: Authorization Authentication Request, AA-Request (AAR)/Authorization Authentication Answer, AA-Answer (AAA), re-authentication and/or re-authorization Request (RAR)/re-authentication and/or authorization answer (RAA), Session-Termination-Request (STR)/Session-Termination-Answer (STA), Abort-Session-Request (ASR)/Abort-Session-Answer (ASA). All the messages for one session have a same <Session-Id>,<Session-Id> to identify the same session.

For the Gq' interface, the format of AAR message is defined as (ETSI TS 183 017):

```
<AA-Request> ::= < Diameter Header: 265, REQ, PXY >
                 < Session-Id >
                 { Auth-Application-Id }
                 { Origin-Host } (origin host)
```

-continued

```
{ Origin-Realm }
{ Destination-Realm }
*[ Media-Component-Description ]
    *[ Flow-Grouping ]
    [ AF-Charging-Identifier ]
    [ SIP-Forking-Indication ]
*[ Specific-Action ]
 [ User-Name ]
 [ Binding-Information ]
 [ Latching-Indication ]
 [ Reservation-Priority ]
 [ Globally-Unique-Address ]
 [ Authorization-Lifetime ]
*[ Proxy-Info ]
*[ Route-Record ]
*[ AVP ]    ( other attribute-value pair)
```

In PCC scheme, the interface between PCRF and AF is Rx interface. The message type relating to the interface includes: AAR/AAA, RAR/RAA, STR/STA, ASR/ASA. All the messages for one session have a same <Session-Id>,<Session-Id> to identify the same session.

The message format for Rx interface is defined as (3GPP TS 29.214):

```
<AA-Request> ::= < Diameter Header: 265, REQ, PXY >
                < Session-Id >
                { Auth-Application-Id }
                { Origin-Host }
                { Origin-Realm }
                { Destination-Realm }
                *[ Media-Component-Description ]
                    *[ Flow-Grouping ]
                    [ AF-Charging-Identifier ]
                    [ SIP-Forking-Indication ]
                *[ Specific-Action ]
                *[ Subscription-ID ]
                *[ Proxy-Info ]
                *[ Route-Record ]
                *[ AVP ]    ( other attribute-value pair )
```

The fixed-mobile convergence (FMC) application includes xDSL fixed access as well as a variety of mobile access schemes such as UMTS RAN access, WiMAX access, W-LAN access. According to the existing ways of implementation, SPDF function entity is needed to support the resource admission and control in fixed access mode. PCRF is also needed to support the resource admission and control in mobile access mode. However, using two sets of bearer control layer entities is not conducive to the construction and maintenance of the network, and not conducive for the AF to implement bearer control, neither.

SUMMARY

Systems and methods for resource admission and control are provided according to embodiments of the present invention. The systems and methods can be used to tackle the problem of complicated network construction and maintenance due to two sets of bearer control layer entities in the prior art.

A resource admission and control system includes:
an interface unit for application function unit, configured to receive a service request sent from the application function unit;
a policy decision function unit, configured to identify the type of an access network according to the service request received by the interface unit for the application function unit and select corresponding service logic for resource admission and control according to the identified type of access network.

A method for resource admission and control includes:
receiving, by a policy decision function unit, a service request sent from an application function unit;
identifying, by the policy decision function unit, the type of an access network according to the service request and selecting a corresponding service logic for resource admission and control according to the type of the access network.

Advantageously, according to the technical solutions provided by the embodiments of the present invention, no matter the request for resource is made to a fixed access network defined in TISPAN, or to a wireless access network defined in the 3GPP, the policy decision function unit xPDF may identify the type of the access network and select corresponding service logic to perform resource admission and control. The xPDF conceals the details of the access network from the AF such that the solution for network construction can be simplified and the system maintenance may become simple and convenient.

BRIEF DESCRIPTION OF THE DRAWING(S)

DETAILED DESCRIPTION

Detailed description according to the present invention is made below in conjunction with the accompanying drawing.

In a fixed-mobile convergence (FMC) scenario, the service layer needs to employ bearer control to control a fixed access network and a mobile access network at the same time. Therefore, support for the convergence of fixed access scheme and the mobile access scheme is required such that the bearer control layer may offer a unified interface for the application layer and block the difference of various access schemes, the difference of control schemes for each access scheme, and the difference between the fixed access scheme and the mobile access scheme in terms of resource control, admission control, charging for the application function, and may provide compatibility with conventional resource admission and control schemes. As such, the issue of a complicated network construction and maintenance due to the deployment of two sets of bearer control function entities in FMC application can be solved.

Figure 1:
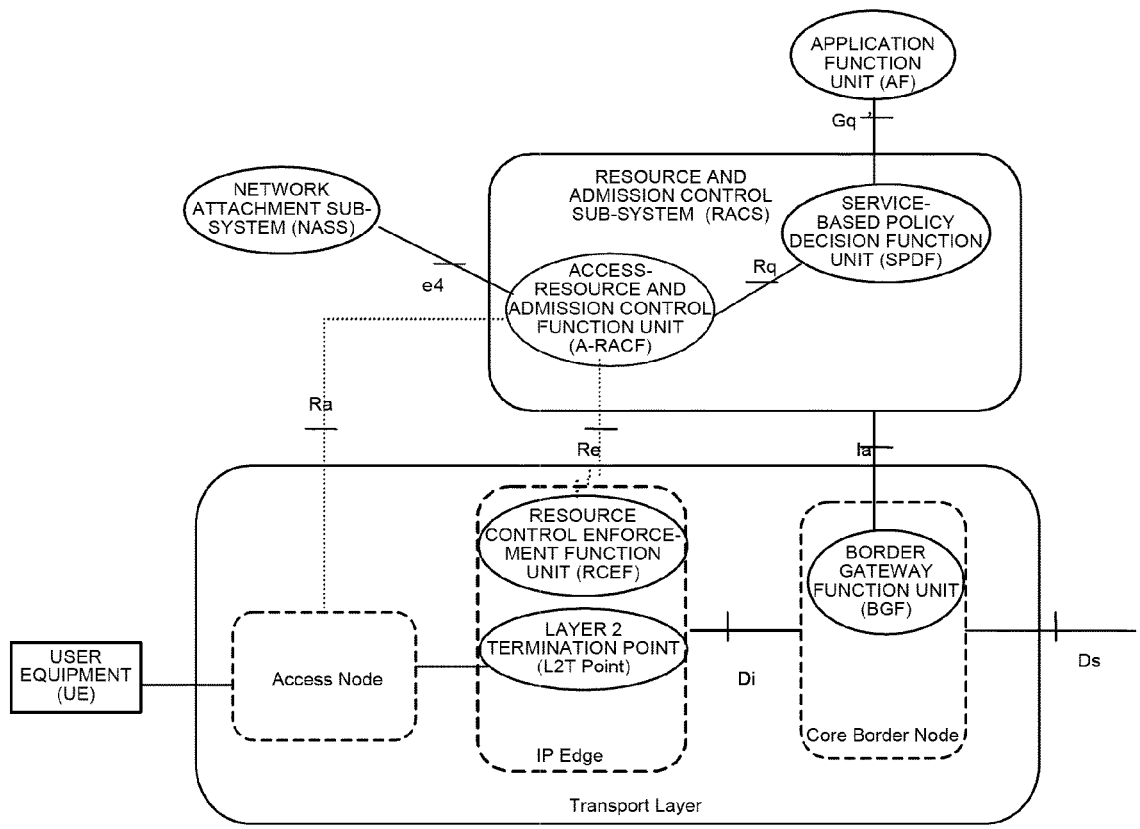
FIG. 1 is a conventional framework of a resource admission and control subsystem based on a fixed network access type and the network environment thereof.
Figure 2:
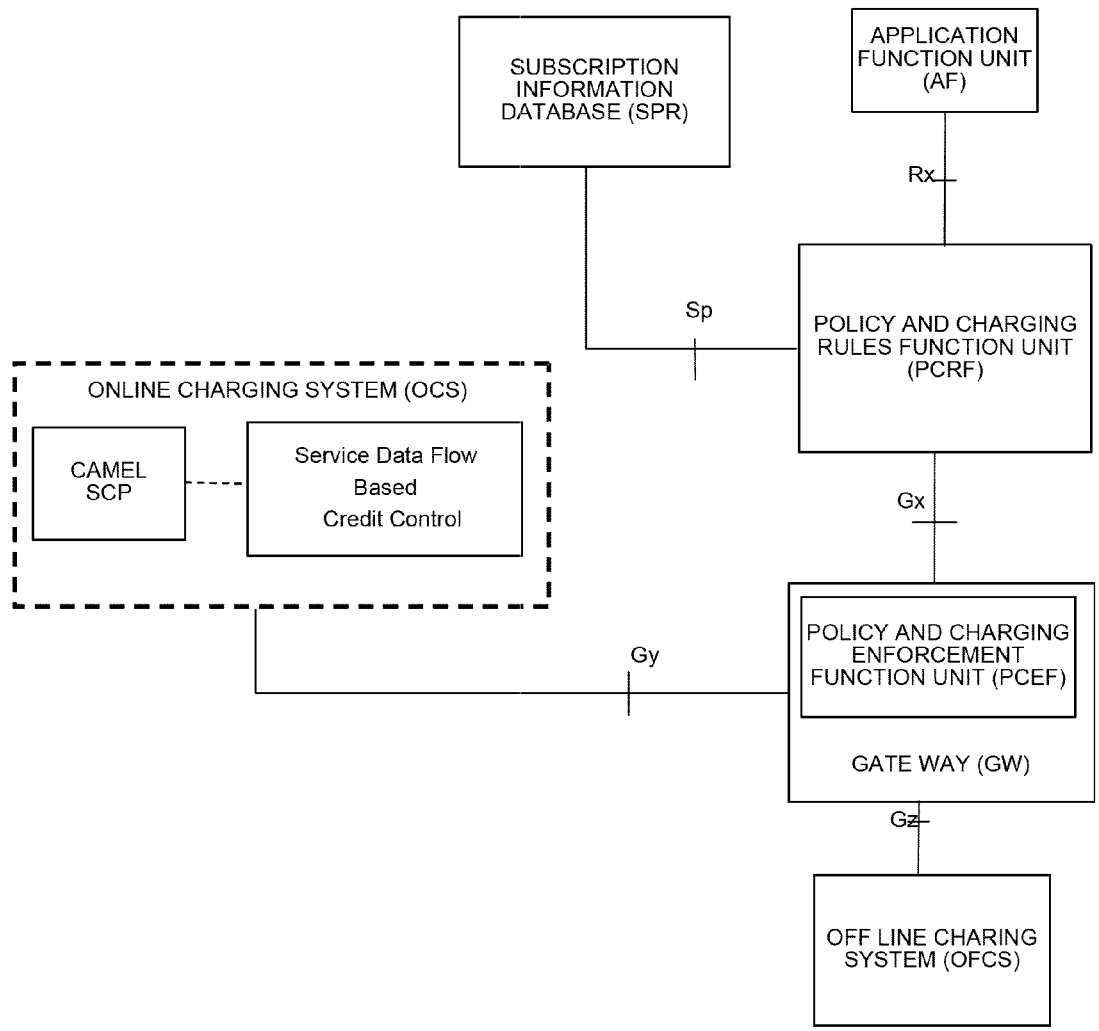
FIG. 2 is a conventional framework of a resource admission and control subsystem based on a mobile network access type and the network environment thereof.
Figure 3:
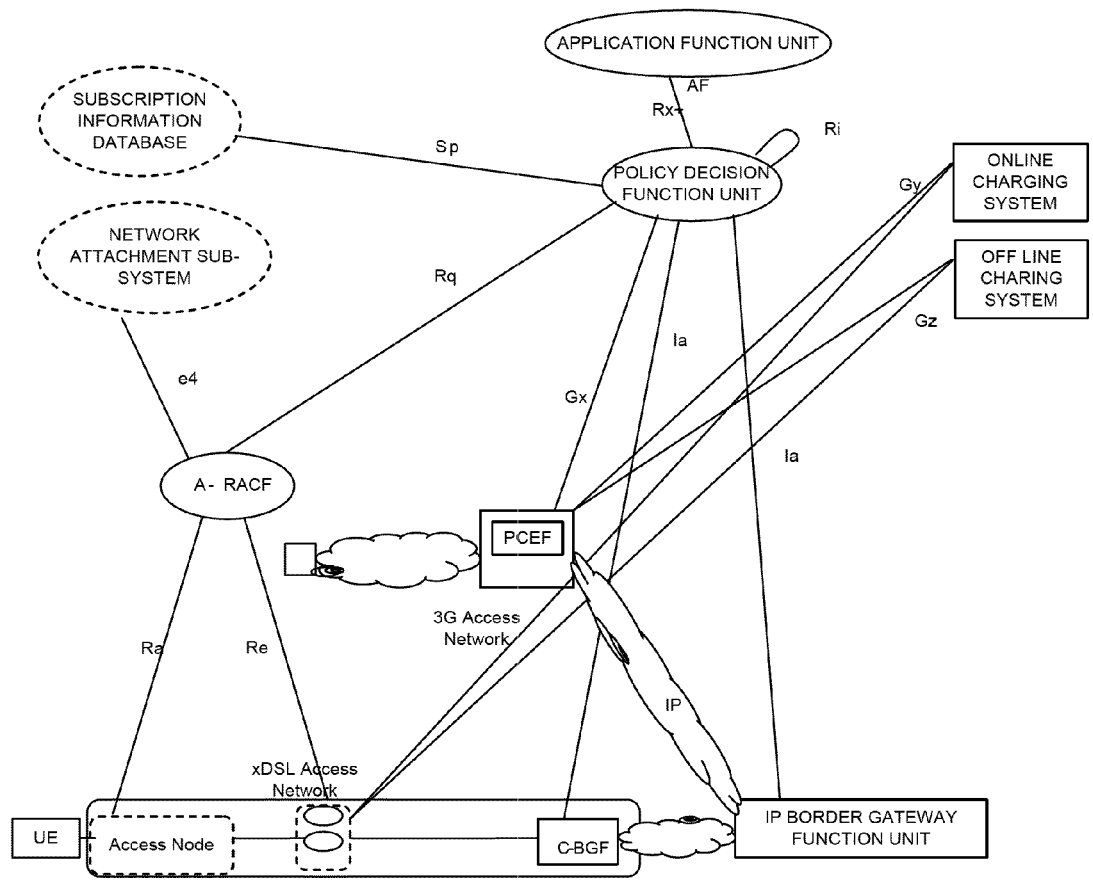
FIG. 3 is an illustration of connection of a resource admission and control system in a network according to one embodiment of the present invention.

FIG. 3 illustrates a system framework of a solution in application according to one embodiment of the present invention. The solution combines the SPDF and PCRF. The combined resource admission and control system provides resource admission and control interface for the application layer function via a unified Rx+ interface.

For ease of illustration, in one embodiment, xPDF is used to indicate a policy decision function unit which implements SPDF and PRCF functions. For compatibility with the existing solutions, the interfaces between the xPDF and service layer AF is Rx+ which employs a diameter protocol.

The AAR message for Rx+ interface is defined as below:

```
<AA-Request> ::= < Diameter Header: 265, REQ, PXY >
                 < Session-Id >
                 { Auth-Application-Id }
                 { Origin-Host }
                 { Origin-Realm }
                 { Destination-Realm }
                 [ Access-Id ]
                 [ Tran-Control-Mode ]
                *[ Media-Component-Description ]
                  *[ Flow-Grouping ]
                 [ AF-Charging-Identifier ]
                 [ SIP-Forking-Indication ]
                *[ Specific-Action ]
                 [ User-Name ]
                 [ Binding-Information ]
                 [ Latching-Indication ]
                 [ Reservation-Priority ]
                 [ Globally-Unique-Address ]
                 [ Authorization-Lifetime ]
                *[ Proxy-Info ]
                *[ Route-Record ]
                *[ AVP ] (other attribute-value pair )
```

Similar to the prior art, the messages relating to the same session uses the same Session-Id. According to one embodiment of the present invention, the xPDF needs to identify if it is intended to control a fixed access network or to control a mobile access network from the first message, namely, AAR message, at the very beginning of the session. The subsequent xPDF may make a correction selection of SPDF or PCRF procedure for implementing resource reservation, admission control and policy control according to the Session-Id information in the subsequent messages. Accordingly, apart from AAR message, the definitions for interfacing with Gq' and Rx interfaces for other messages such as AAA, RAR/RAA, STR/STA, ASR/ASA remain unchanged.

The Access-Id field may be defined as an AVP of enumeration type (AVP type code is to be assigned). The Access-Id may be used to identify and recognize the type of the access network. It can be defined as follow.

xDSL access, with a value of 0;
GGSN mobile access network, with a value of 1;
WLAN fixed access network, with a value of 2;
WLAN mobile access network, with a value of 3;
WiMAX fixed access network, with a value of 4;
WiMAX mobile access network, with a value of 5.

By expanding the enumeration value, other types of access networks may also be defined. The purpose of adding attribute value of Access-Id in the Rx+ is that the xPDF may identify if the current service is directed to control a fixed access network or a mobile access network at the very beginning of each session according to the assigned value of Access-Id field.

According to one embodiment of the present invention, a Tran-Control-Mode field may also be defined as an AVP of enumeration type (AVP type code is to be assigned). The Tran-Control-Mode field is used to indicate the bearer control scheme. The bearer control scheme is used to indicate which manner the xPDF employs to implement bearer control, e.g., push manner or pull manner, on-path manner or off-path manner.

In a specific scenario, the attribute values for User-Name field, Subscription-ID field, Globally-Unique-Address field in AAR can also be used to identify the type of the access networks. For instance, the range of the value for the aforementioned fields and the relationship between the range and the type of the access networks may be used to identify the type of the access networks. If different types of access networks can be recognized by the attribute values for User-Name, Subscription-ID, or Globally-Unique-Address, the relationship between the range of values for the aforementioned fields and the type of the access networks may be given as shown in below table.

TABLE ONE

|  | Type of Access Network |
|---|---|
| User-Name |  |
| Zhang San | xDSL |
| Li Si | WiMAX |
| Subscription-ID |  |
| 139xxxxxxxx | GGSN |
| 2887xxxx | xDSL |
| Globally-Unique-Address |  |
| 10.20.x.x | xDSL |
| 20.20.x.x | GGSN |

The first column in Table ONE is the specific value for the corresponding field whereas the second column is the type of the access networks to which the specified value corresponds. In practice, xPDF looks up the above table with the above specific value of each field in the AAR messages relating to the Rx+ interface. If the type of the access network is located, then an associated manner can be determined for resource control for the access network.

Figure 4:
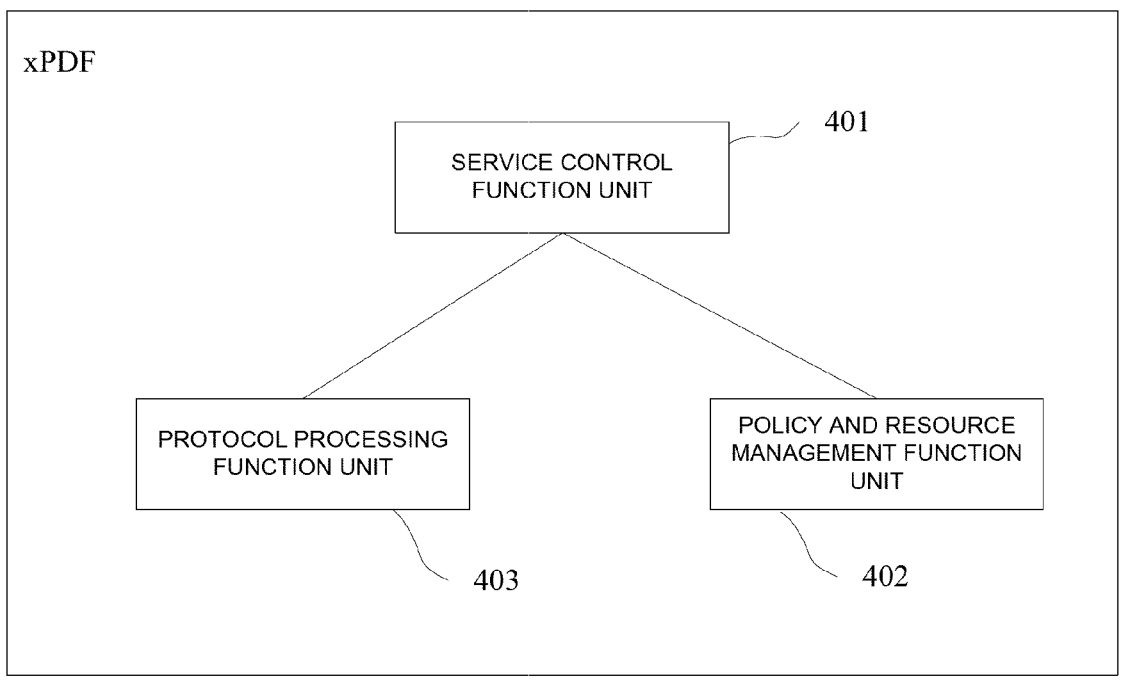
FIG. 4 is a block diagram of xPDF according to one embodiment of the present invention.

FIG. 4 illustrates one implementation of the xPDF. The implementation mainly includes a service control function unit 401, policy and resource management function unit 402, and a protocol processing function unit 403.

In the implementation, after the service control function unit 401 receives a message from AF from the protocol processing function unit 403. The service control function unit 401 initially checks if the message is an AAR message and check the AAR message if it includes an Access-Id attribute. If it includes the Access-Id attribute, the type of the access network can be determined according to Access-Id and corresponding service logic is thus selected for resource admission and control.

If the above message does not include Access-Id attribute, the service control function unit 401 proceeds to check the existence of attribute value of User-Name, Subscription-ID, Globally-Unique-Address. If the message includes such attribute values, corresponding type of access network can be determined by looking up Table ONE according to the configuration data, and corresponding service logic is thus selected for resource admission and control. If the type of the access network cannot be found, the processing will be done according to a default control manner, including returning an error message to the AF.

If the above message includes a Tran-Control-Mode field, the xPDF may implement resource admission and control according to the bearer control mode associated with the content of the field.

During the foregoing process, the policy and resource management function unit 402 may provide policy and resource information for the service control function unit 401.

Figure 5:
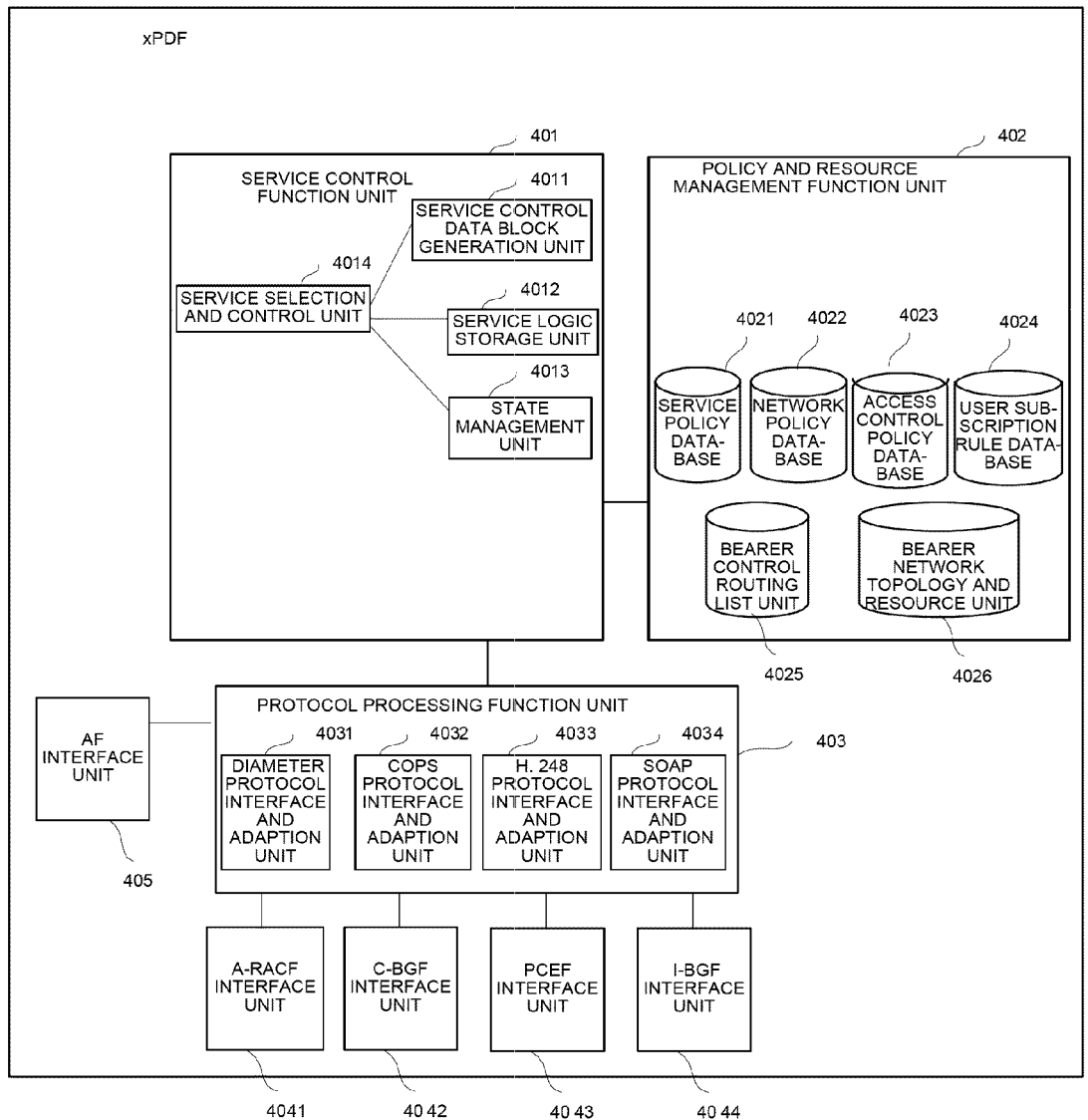
FIG. 5 is a detailed block diagram of xPDF according to one embodiment of the present invention.

FIG. 5 is a detailed diagram of xPDF. As can be seen from the figure, the protocol processing function unit 403 further includes:

a Diameter protocol (new generation of AAA protocol) interfacing and adaption unit 4031, configured to process Diameter protocol;

a Common Open Policy Service (COPS) protocol interfacing and adaption unit 4032, configured to process COPS protocol;

an H.248 protocol interfacing and adaption unit 4033, configured to process H. 248 protocol; and a Simple Object Access Protocol (SOAP) protocol interfacing and adaption unit 4034, configured to process SOAP protocol.

The above service control function unit 401 further includes a service control data block generation unit 4011, configured to generate service control data block after receiving a service request processed by the protocol processing unit. The service control data block is identified by the identifier <session-id>. The service control data block records the service request processing. The state of the service control data block is managed by a state management unit 4013.

In the above scheme, the service control function unit 401 may further include:

a service logic storage unit 4012 configured to store service logic;

a state management unit 4013 configured to manage the state of service; and a service selection and control unit 4014 configured to select and control service request according to the policy and resource information provided by the policy and resource management function unit.

Figure 6:
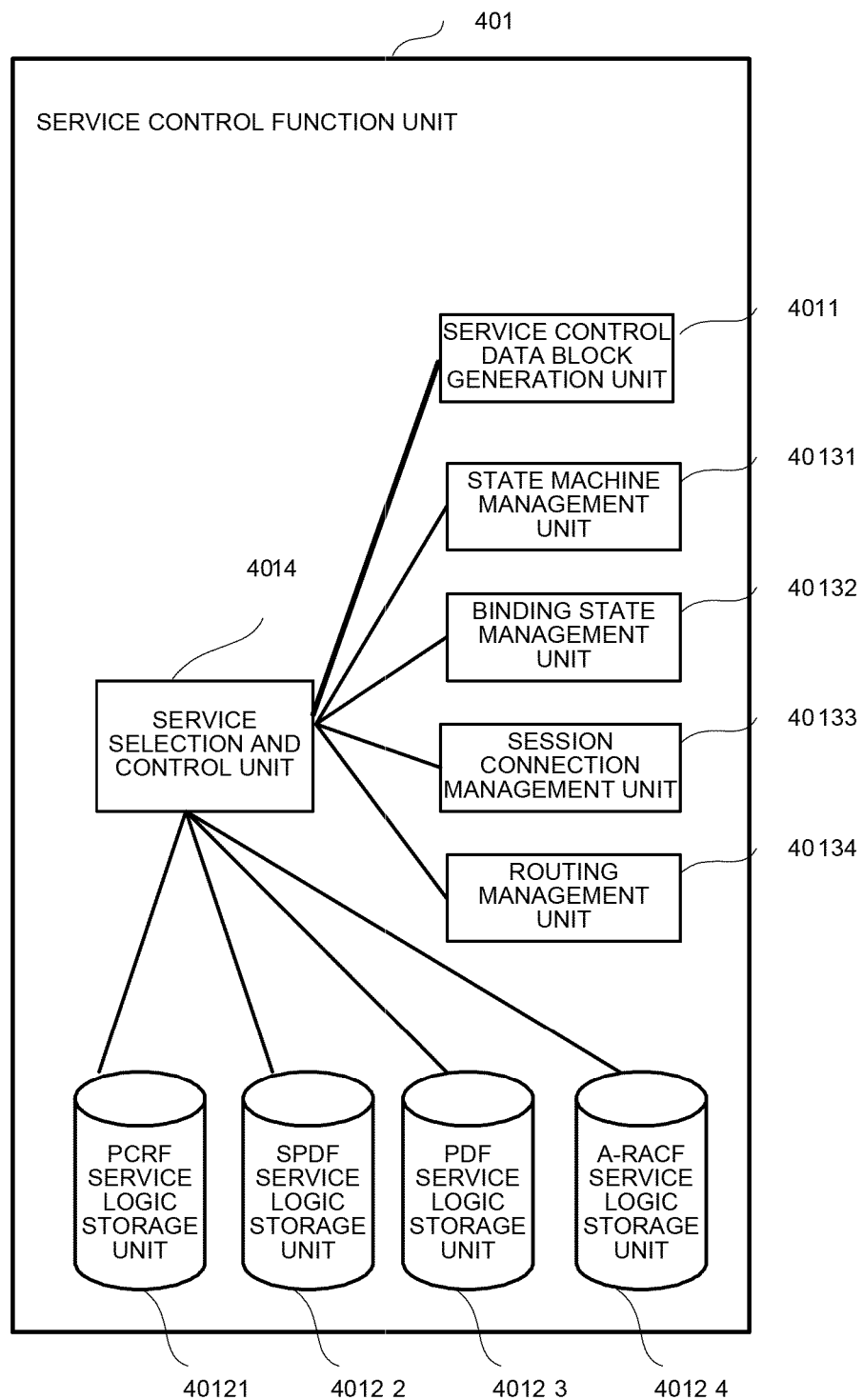
FIG. 6 is a detailed block diagram of a service control function unit according to one embodiment of the present invention.

As illustrated in FIG. 6, the foregoing service logic storage unit 4012 further includes:

a PCRF service logic storage unit 40121 configured to store PCRF service logic;

an SPDF service logic storage unit 40122 configured to store SPDF service logic;

a policy decision function (PDF) service logic storage unit 40123 configured to store PDF service logic; and an A-RACF service logic storage unit 40124 configured to store A-RACF service logic.

The above state management unit 4013 further includes:

a state machine management unit 40131 configured to manage the state of service control data block;

a binding state management unit 40132 configured to manage the binding relation between the service and the rule;

a session connection management unit 40133 configured to manage service session connection; and a routing management unit 40134 configured to manage the routing between the bearer entities.

The above policy and resource management function unit 402 further includes:

a service policy database 4021 configured to store service policies;

a network policy database 4022 configured to store network policies;

an access control policy database 4023 configured to store access control policy;

a user subscription rule database 4024 configured to store user subscription rules;

a bearer control routing list unit 4025 configured to store routing information relating to the bearer control; and a bearer network topology and resource unit 4026 configured to store network topology and resource information.

The policies or resource information stored in the above units may be provided to the service control function unit 401 according to the actual requirements.

In the above scheme, the xPDF further includes:

an A-RACF interface unit 4041 configured to provide an interface for interacting with the A-RACF;

a Core-Border Gateway Function (C-BGF) interface unit 4042 configured to provide an interface for interacting with the C-BGF;

a Policy and Charging Enforcement Function (PCEF) interface unit 4043 configured to provide an interface for interacting with the PCEF; and an Interconnection-Border Gateway Function (I-BGF) interface unit 4044 configured to provide an interface for interacting with the I-BGF.

In the above scheme, with respect to AF, an AF interface unit 405 may further be provided in the xPDF. The AF interface unit may include different configuration schemes.

If the xPDF employs the Session-Id information or Tran-Control-Mode field information carried in the service request transmitted by the AF to recognize the type of the access network, the AF interface unit can be set as a unified interface unit.

If the AF may recognize the type of the access network by itself, different AF interface units for different types of access networks can be set in the xPDF. The AF interface unit 405 may be set according to different types of access network such that the AF may determines the type of the access network and may send service requests to different AF interface units according to different types of access network. The identification of the type of the access network can be done without the help of service request information. Rather, the xPDF may identify the type of the access network directly by virtue of different port numbers.

In the above scheme, the service request from the AF is processed as follow.

The service control data block generation unit 4011 generates a service control data block after receiving the AAR message processed by the protocol processing function unit. The service control data block is identified by session-id. The state of service control data block is managed by a station machine management unit 40131. The binding relation between the service and the rule is managed by a binding state management unit 40132. The service session is managed by a session connection management unit 40133. The routing between the bearer control entities is managed by a routing management unit 40134.

If the above service request message is not an AAR message, and if the respective dedicated service procedure of SPDF and PCRF can be identified according to the message, the service selection and control selection unit may operate according to the respective procedure. Otherwise, the service selection and control selection unit locates a corresponding service control data block according to the session-id in the message and implements bearer control according to a corresponding state machine and received information.

The policy rule, bearer topology resource, bearer control routing data required during service control process can be found by the service selection and control unit 4014 looking up in the policy and resource management function unit 403.

As can be seen, compared with prior art, the conventional SPDF and PCRF may simply implement the SPDF and PCRF function separately with no needs for implementing service selection and control function or the like. However, the embodiments of the present invention combine the SPDF and PCRF functions and overcome the deficiency of having various frameworks and solutions for resource admission and bearer control due to various access types.

Figure 7:
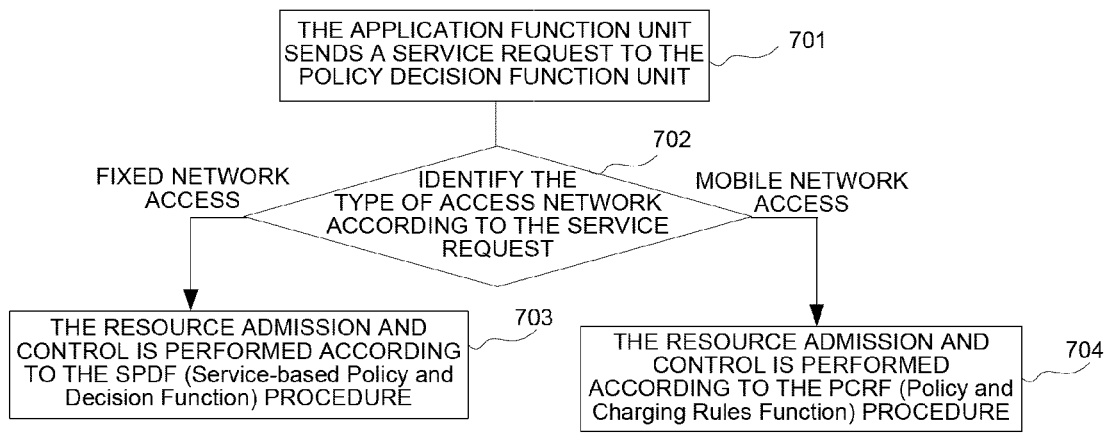
FIG. 7 is a schematic flowchart according to one embodiment of the present invention.

FIG. 7 is a schematic flowchart according to one embodiment of the present invention where the following main steps are included, as illustrated in this figure.

At step 701, the application function unit sends a service request to the policy decision function unit.

At step 702, the policy decision function unit identifies the type of the access network according to the service request and selects corresponding service logic for resource admission and control according to the type of the access network.

At step 703, if the type of the access network is a fixed network access, the resource admission and control is performed according to the service-based policy and decision function (SPDF) procedure.

At step 704, if the type of the access network is a mobile network access, the resource admission and control is performed according to the (PCRF) procedure.

The foregoing service request includes an access identifier (Access-Id) field. The information of the type of the access network is carried in the Access-Id.

The foregoing service request further includes a User-Name field, a User Subscription-ID field, or a Globally-Unique-Address field. The policy decision function unit may identify the type of the access network according to the value range of the field.

In the foregoing scheme, if the service request further carries a bearer control mode, then the procedure may further includes identifying, by the policy decision function unit, the bearer control mode according to the service request and selecting corresponding service logic for resource admission and control according to the bearer control mode.

The control mode information can be included in the service request. The bearer control mode information can be carried in the bearer control mode field, i.e., Tran-Control-Mode.

In the foregoing scheme, the application function unit may also be used to identify the type of the access network and to send the service request to different AF interface units according to the identified type of access network. The xPDF may operate according to the identified type of access network. As such, the type of the access network can be identified with no need for service request information. Rather, the type of the access network can be identified directly according to the port number.

In practice, there are lots of PCRF related procedures which can be classified into types of IP-CAN session setup, an IP-CAN session termination and an IP-CAN session modification. Each type may include lots of procedures according to different cases and scenarios. Some may be a PCRF-specific procedure which can be identified by a first message initiated. Some may be similar to the service control procedure in the SPDF, which can be identified according to the method provided by the embodiments of the present invention. SPDF is the same. Some may be a SPDF-specific procedure which can be identified by a first message initiated. Some may be similar to the service control procedure in the PCRF, which can be identified according to the method provided by the embodiments of the present invention.

Figure 8:
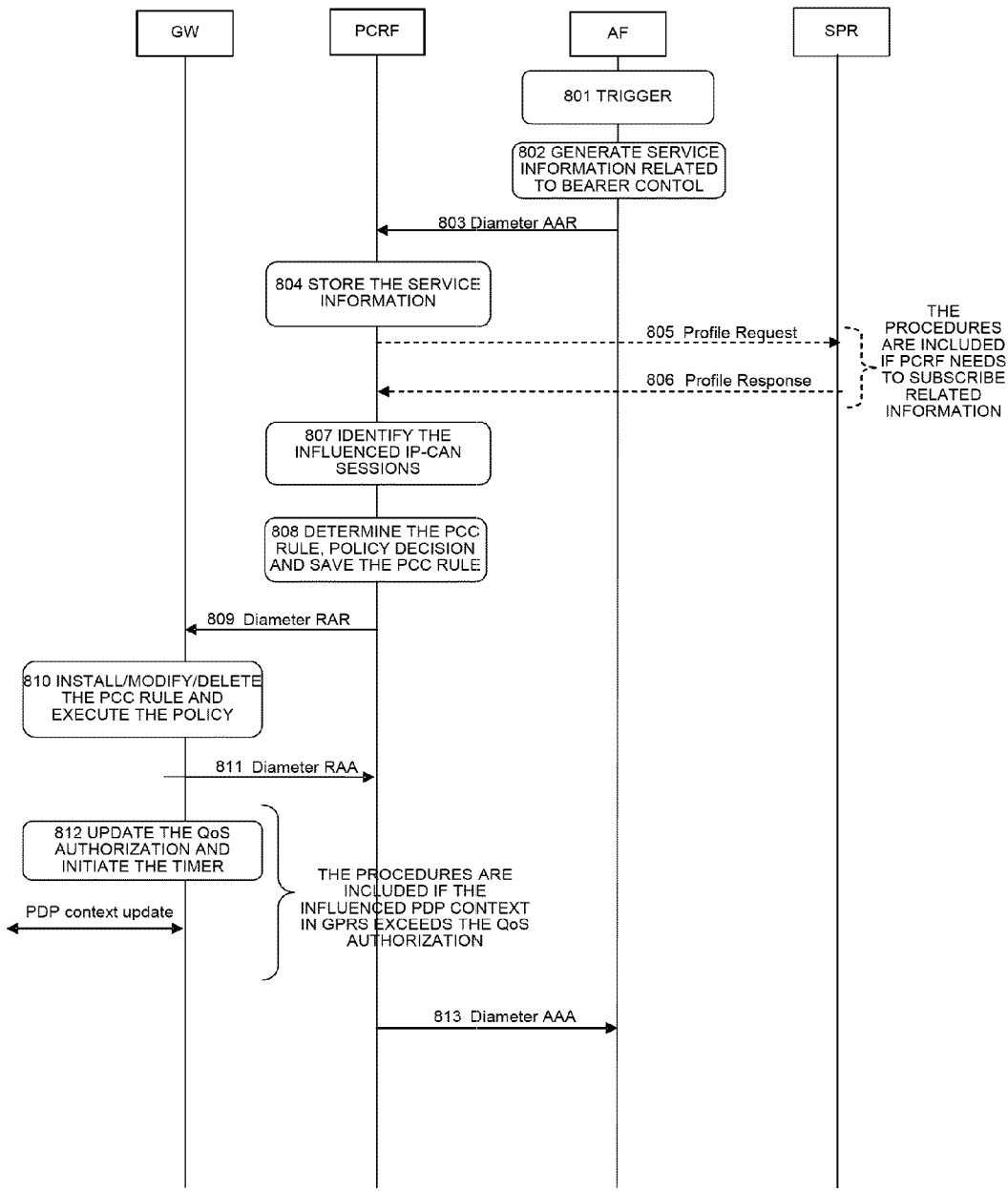
FIG. 8 is an illustration of session setup procedure initiated by the AF in PCRF.

FIG. 8 is a session setup procedure initiated by AF in the PCRF. The procedure includes the following steps.

At step 801, the service on the AF requires to trigger a policy and charging control.

At step 802, the AF generates service information related to bearer control according to the applied context.

At step 803, the request is sent via an AAR message to the PCRF.

At step 804, the service related information is stored in the PCRF.

At step 805, if the subscription-related user information is required, send a request to SPR.

At step 806, the SPR responds to the request and returns the subscription-related user information.

At step 807, the sessions which influence the IP-CAN are identified.

At step 808, the locally configured policy is used. A decision is made according to the service related information and the subscription-related user information.

At step 809, the control policy and charging rule are delivered to GW via a RAR message.

At step 810, the GW installs/modifies/deletes the PCC rule and executes the policy.

At step 811, the GW makes a response via an RAA message.

At step 812, if QoS authorization or timer needs to be updated, the GW initiates to update PDP context.

At step 813, the PCRF sends a AAA message to AF.

Figure 9:
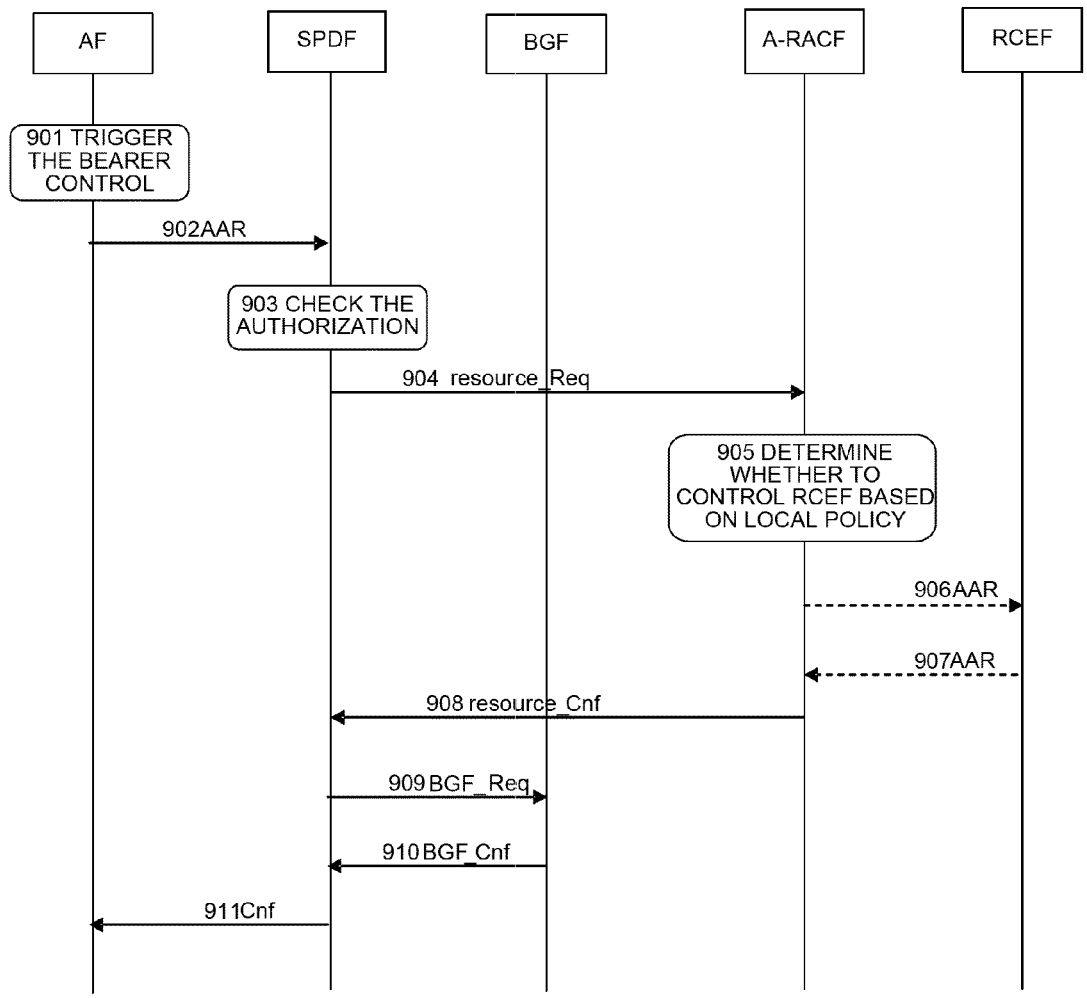
FIG. 9 is an illustration of resource request procedure initiated by the AF in SPDF.

FIG. 9 is a resource request procedure initiated by AF in the SPDF. The procedure includes the following steps.

At step 901, the AF triggers the bearer control as required.

At step 902, an AAR message is used to request the resource admission and control from the SPDF.

At step 903, the SPDF checks authorization and determines the policy.

At step 904, a request is made to A-RACF for access resource control.

At step 905, the A-RACF employs the local policy and determines if to issue the policy to RCEF.

At step 906, if the A-RACF needs to issue the policy to the RCEF, it issue the policy to the RCEF via an AAR message.

At step 907, the RCEF responds to the policy installment state.

At step 908, the A-RACF sends a respond of the result of access resource request to the SPDF.

At step 909, the SPDF issues a gateway control policy to the BGF (such as gate control, address conversion, etc).

At step 910, the BGF responds to the request.

At step 911, the SPDF responds to the request.

Figure 10:
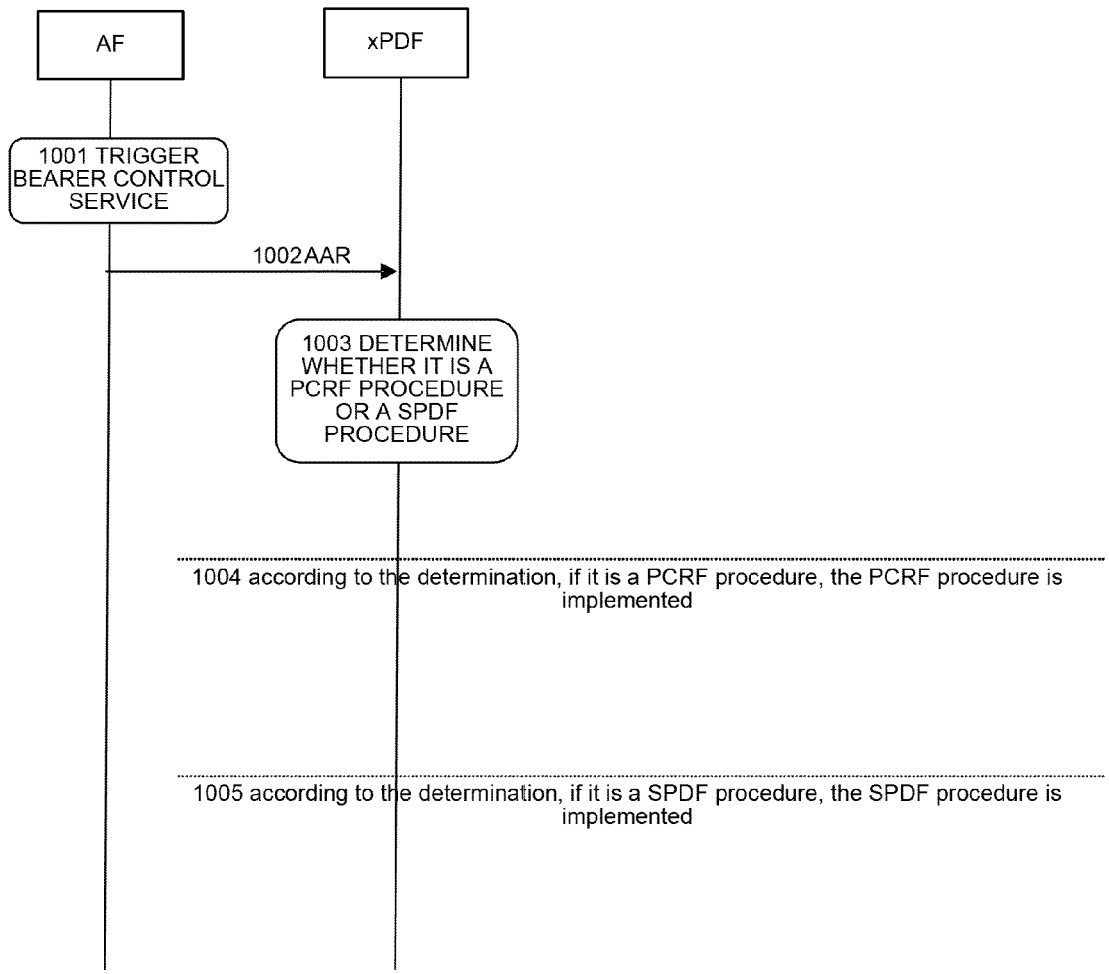
FIG. 10 is an illustration of resource request procedure initiated by the AF in xPDF according to one embodiment of the present invention.

FIG. 10 is an illustration of resource request procedure initiated by the AF in xPDF according to one embodiment of the present invention.

At step 1001, the AF triggers a resource control request upon service request.

At step 1002, the AF delivers a resource control request to the xPDF via an AAR message.

At step 1003, the xPDF determines which access resource control procedure to take according to the information in the AAR message.

At step 1004, if it is a PCRF procedure, the bearer control is implemented according to the service procedure illustrated in FIG. 8.

At step 1005, if it is an SPDF procedure, the bearer control is implemented according to the service procedure illustrated in FIG. 9.

Apparently, various modifications and variations may be made by those skilled in the art without departing from the spirit and scope of the present invention. Accordingly, the present invention is intended to cover these modifications and variations if these modification and variation according to the present invention fall within the scope of the claims of the present invention and equivalent thereof.

What is claimed is:

1. A method of resource admission and control comprising:
receiving,
by an interface unit for an application function unit, a service request sent from the application function unit, wherein the service request carries information of a type of an access network;
implementing, by a policy decision function unit, a service-based policy and decision function (SPDF) and a policy and charging rules function (PCRF); identifying the type of the access network according to the service request received by the interface unit for the application function unit, and selecting corresponding service procedure for the resource admission and control according to the type of the access network;
wherein if the type of the access network is a fixed network access, the resource admission and control is performed according to an SPDF procedure; and
wherein if the type of the access network is a mobile network access, the resource admission and control is performed according to a PCRF procedure;
wherein the service request further carries information of a bearer control mode, the policy decision function unit is further configured to identify the bearer control mode according to the service request and select a corresponding service procedure for resource admission and control according to the bearer control mode;
wherein the bearer control mode is used to indicate which manner the policy decision function unit employs to implement bearer control; and
wherein the bearer control mode comprises one of the group consisting of push manner, pull manner, on-path manner and off-path manner.

2. The method of claim 1, further comprising:
performing, by a protocol processing function unit, protocol processing upon the service request received by the interface unit for the application function unit;
receiving, the service request processed by the protocol processing function unit, identify the type of the access network, and select a corresponding service procedure for resource admission and control; and
providing, by a policy and resource management function unit, policies and resources information for the service control function unit.

3. The method of claim 2, wherein the protocol processing function unit further comprises one or any combination of units from the following set of unit types:
a Diameter protocol interfacing and adaption unit, configured to process according to a Diameter protocol;
a Common Open Policy Service (COPS) protocol interfacing and adaption unit, configured to process according to a COPS protocol;
a H.248 protocol interfacing and adaption unit, configured to process according to an H.248 protocol; and
a Simple Object Access Protocol (SOAP) protocol interfacing and adaption unit, configured to process according to a SOAP protocol.

4. The method of claim 2, wherein the service control function unit further comprises:
a service control data block generation unit, configured to generate a service control data block after receiving the service request processed by the protocol processing unit.

5. The method of claim 2, wherein the policy and resource management function unit comprises one or any combination of units from the following set of unit types:
a service policy database, configured to store service policies;
a network policy database, configured to store network policies;
an access control policy database, configured to store access control policies;
a user subscription rule database, configured to store user subscription rules;
a bearer control routing list unit, configured to store routing information relating to the bearer control; and
a bearer network topology and resource unit, configured to store network topologies and resource information.

6. The method of claim 1, wherein there are multiple application function interface units for receiving service requests regarding different types of access networks sent from the application function unit.

7. The method of claim 1, wherein the policy decision function unit further comprises one or any combination of units from the following set of unit types:
an A-RACF interface unit, configured to provide an interface for interacting with the A-RACF;
a Core-Border Gateway Function interface unit, configured to provide an interface for interacting with the C-BGF;
a Policy and Charging Enforcement Function interface unit, configured to provide an interface for interacting with the PCEF; and
an Interconnection-Border Gateway Function interface unit, configured to provide an interface for interacting with the I-BGF.

8. The method of claim 1, wherein the service request comprises an Access-Id field which carries the information of the type of the access network.

9. The method of claim 1, wherein the service request comprises a User-Name field, a Subscription-ID field or a Globally-Unique-Address field, wherein the policy decision function unit identifies a corresponding type of access network according to the User-Name field, the Subscription-ID field or the Globally-Unique-Address field.

10. The method of claim 1, wherein the identifying the type of the access network according to the service request comprises: identifying, by the policy decision function unit, the type of the access network according to the service requests regarding different types of the access networks sent by the application function unit.

11. A method for resource admission and control, comprising:
receiving, by a policy decision function unit which implements a service-based policy and decision function (SPDF) and a policy and charging rules function (PCRF), a service request carrying information of a bearer control mode that is sent from an application function unit; and
identifying, by the policy decision function unit, the bearer control mode according to the service request, and selecting corresponding service procedure for resource admission and control according to the bearer control mode;
wherein the bearer control mode is used to indicate which manner the policy decision function unit employs to implement bearer control; and wherein the bearer control mode comprises one of the group consisting of push manner, pull manner, on-path manner and off-path manner.

\* \* \* \* \*